(12) United States Patent
Lee et al.

(10) Patent No.: US 10,575,335 B2
(45) Date of Patent: Feb. 25, 2020

(54) METHOD FOR CONTENTION RESOLUTION IN A RANDOM ACCESS PROCEDURE IN A D2D COMMUNICATION SYSTEM AND DEVICE THEREFOR

(71) Applicant: LG ELECTRONICS INC., Seoul (KR)

(72) Inventors: Sunyoung Lee, Seoul (JP); Seungjune Yi, Seoul (JP)

(73) Assignee: LG ELECTRONICS INC., Seoul (KR)

( * ) Notice: Subject to any disclaimer, the term of this patent is extended or adjusted under 35 U.S.C. 154(b) by 119 days.

(21) Appl. No.: 15/507,958

(22) PCT Filed: Jul. 27, 2015

(86) PCT No.: PCT/KR2015/007800
§ 371 (c)(1),
(2) Date: Mar. 1, 2017

(87) PCT Pub. No.: WO2016/056738
PCT Pub. Date: Apr. 14, 2016

(65) Prior Publication Data
US 2017/0311354 A1    Oct. 26, 2017

Related U.S. Application Data

(60) Provisional application No. 62/076,487, filed on Nov. 7, 2014, provisional application No. 62/060,523, filed on Oct. 6, 2014.

(51) Int. Cl.
*H04W 74/08*    (2009.01)
*H04W 74/00*    (2009.01)
*H04W 92/18*    (2009.01)

(52) U.S. Cl.
CPC ..... *H04W 74/0833* (2013.01); *H04W 74/006* (2013.01); *H04W 92/18* (2013.01)

(58) Field of Classification Search
CPC ........... H04W 74/0833; H04W 74/006; H04W 92/18; H04W 76/023; H04W 72/042;
(Continued)

(56) References Cited

U.S. PATENT DOCUMENTS 9,794,972 B2 * 10/2017 Lu ..................... H04W 76/14
2003/0078060 A1 * 4/2003 Becker .............. H04M 3/42382
                                                                            455/466
(Continued)

FOREIGN PATENT DOCUMENTS

WO    WO-2013073915 A1 *  5/2013  ............. H04L 5/003
WO    WO 2014/092616 A1   6/2014

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 12)," 3GPP TS 36.321 V12.3.0, Sep. 23, 2014, pp. 1-57.

(Continued)

*Primary Examiner* — Michael Thier
*Assistant Examiner* — Nevena Zecevic Sandhu
(74) *Attorney, Agent, or Firm* — Birch, Stewart, Kolasch & Birch, LLP

(57) ABSTRACT

A method and a device for contention resolution in a random access procedure in a D2D communication system are discussed. The method includes transmitting a message containing a buffer status information for data transmission over PC5 interface in a random access procedure; receiving a Physical Downlink Control Channel (PDCCH) in response to the message; and considering contention resolution suc- (Continued)

cessful if the received PDCCH is addressed to sidelink-RNTI (SL-RNTI).

4 Claims, 8 Drawing Sheets

(58) Field of Classification Search
CPC ............. H04W 72/02; H04W 72/1284; H04W 72/0486
See application file for complete search history.

(56) References Cited

U.S. PATENT DOCUMENTS

2007/0291719 A1* 12/2007 Demirhan ........... H04W 74/008
370/338
2013/0322413 A1 12/2013 Pelletier et al.
2015/0382324 A1* 12/2015 Sheng ................... H04W 72/02
370/329

OTHER PUBLICATIONS

3GPP, "3rd Generation Partnership Project; Technical Specification Group Radio Access Network; Study on LTE Device to Device Proximity Services; Radio Aspects (Release 12)," 3GPP TR 36.843 V12.0.1, Mar. 27, 2014, pp. 1-50.
Tsolkas et al., "LTE-A Access, Core, and Protocol Architecture for D2D Communication," Smart Device to Smart Device Communication, ISBN 978-3-319-04963-2, Apr. 6, 2014, pp. 23-40 (19 pages).

* cited by examiner

[Fig. 1] --PRIOR ART--
E-UMTS
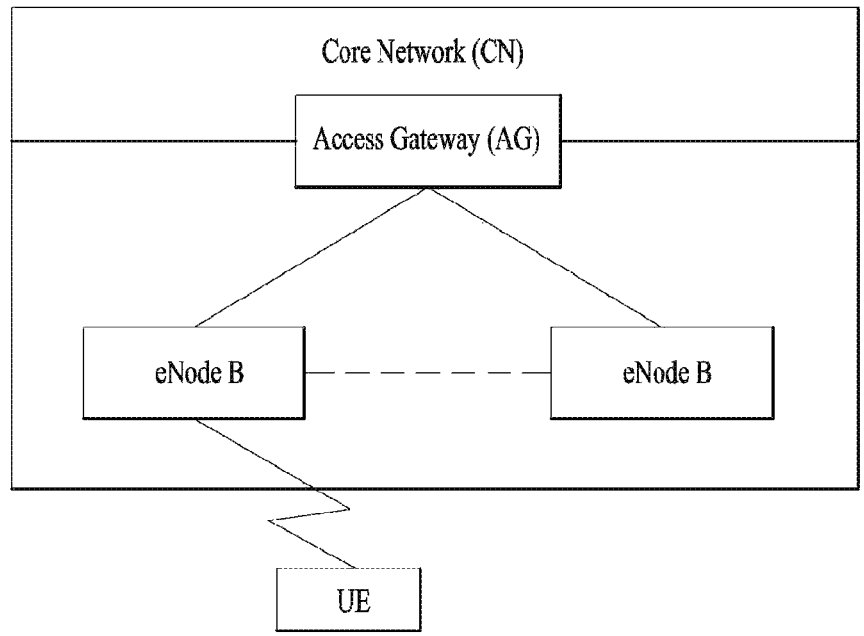
[Fig. 2a]
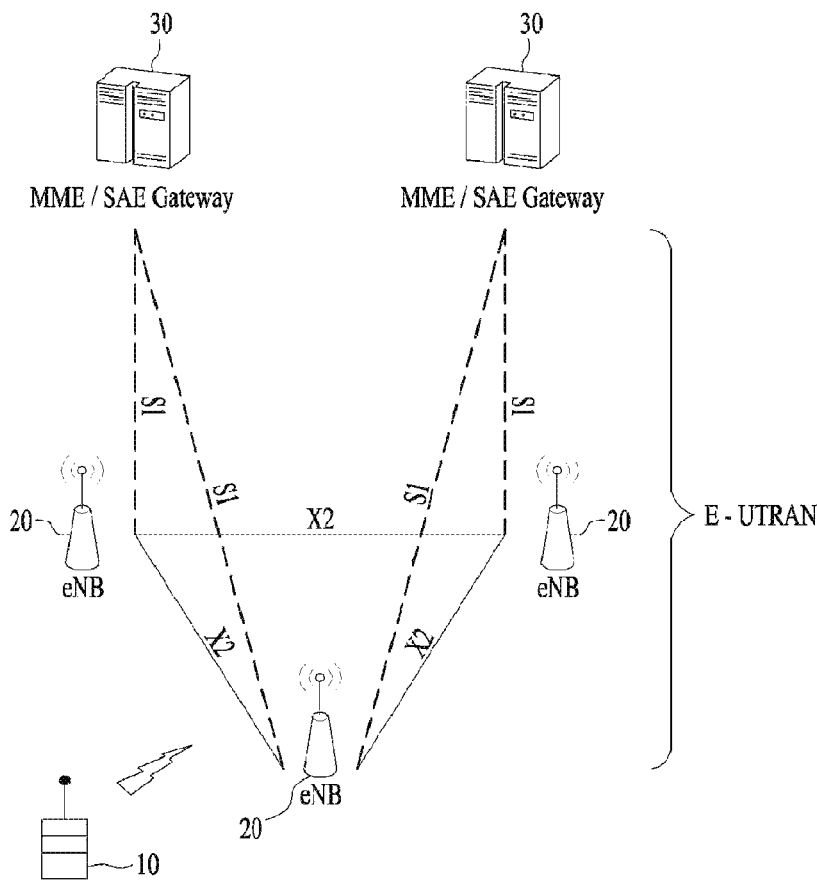

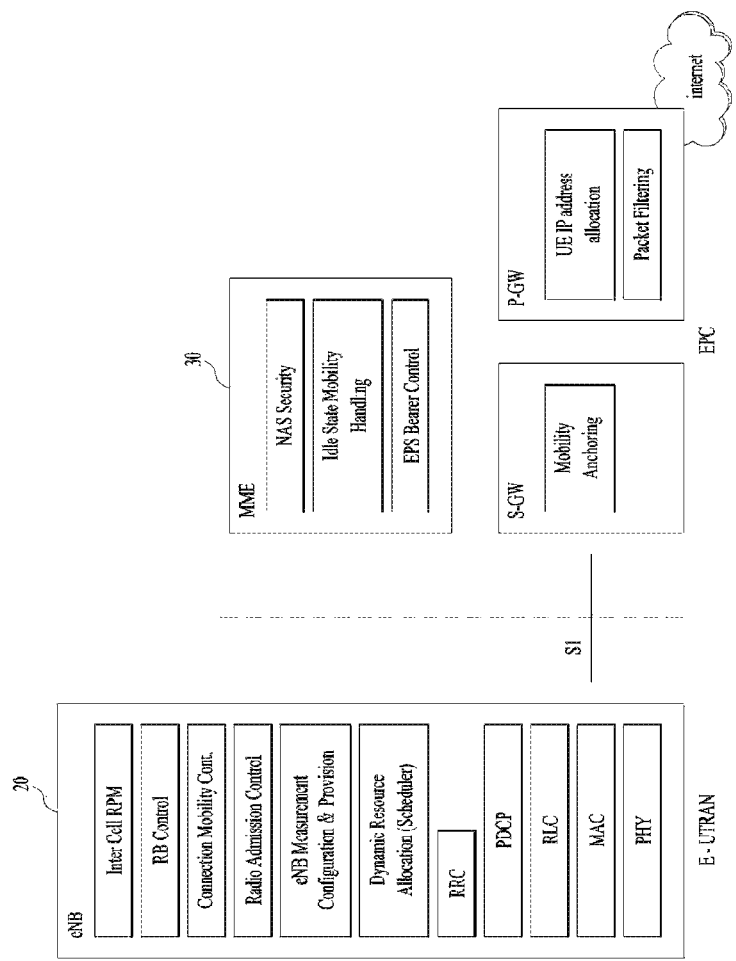

[Fig. 3]
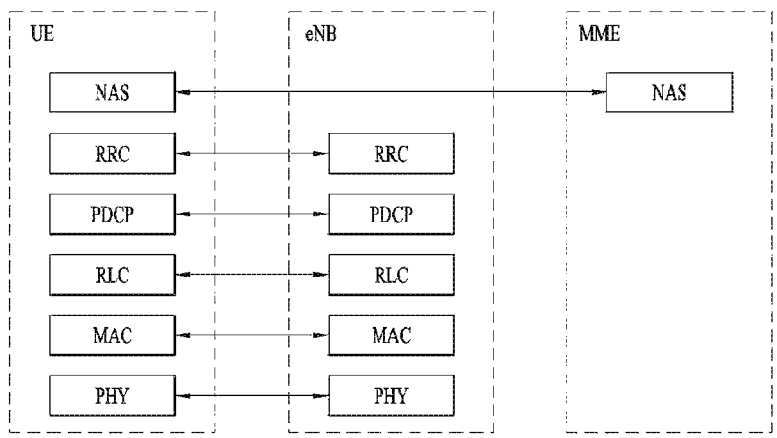
(a) Control-Plane Protocol Stack
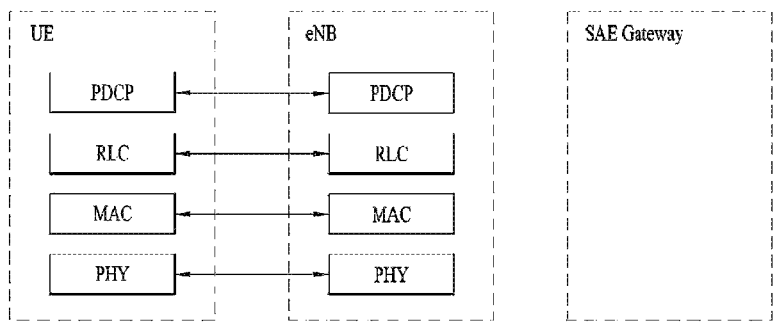
(b) User-Plane Protocol Stack
[Fig. 4]
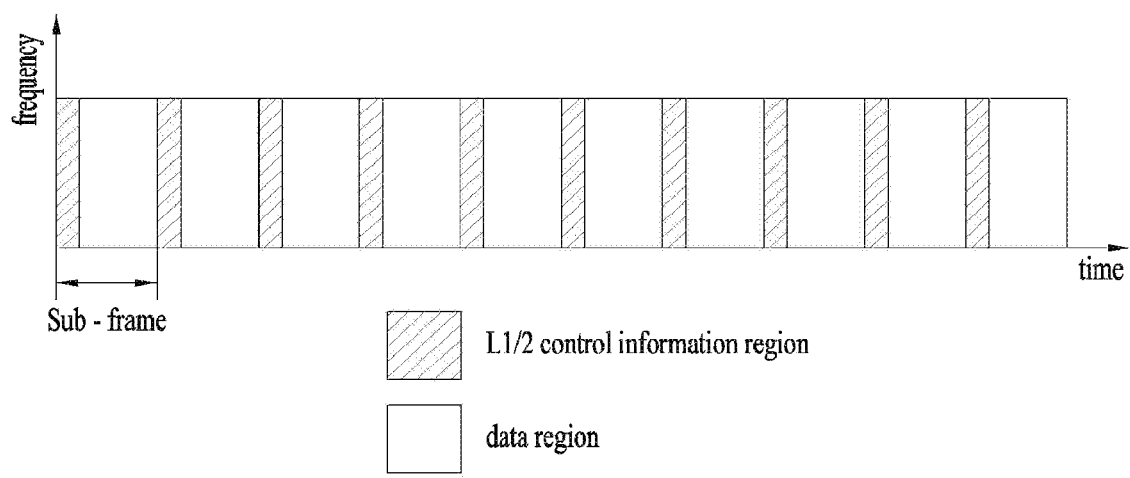

[Fig. 5]
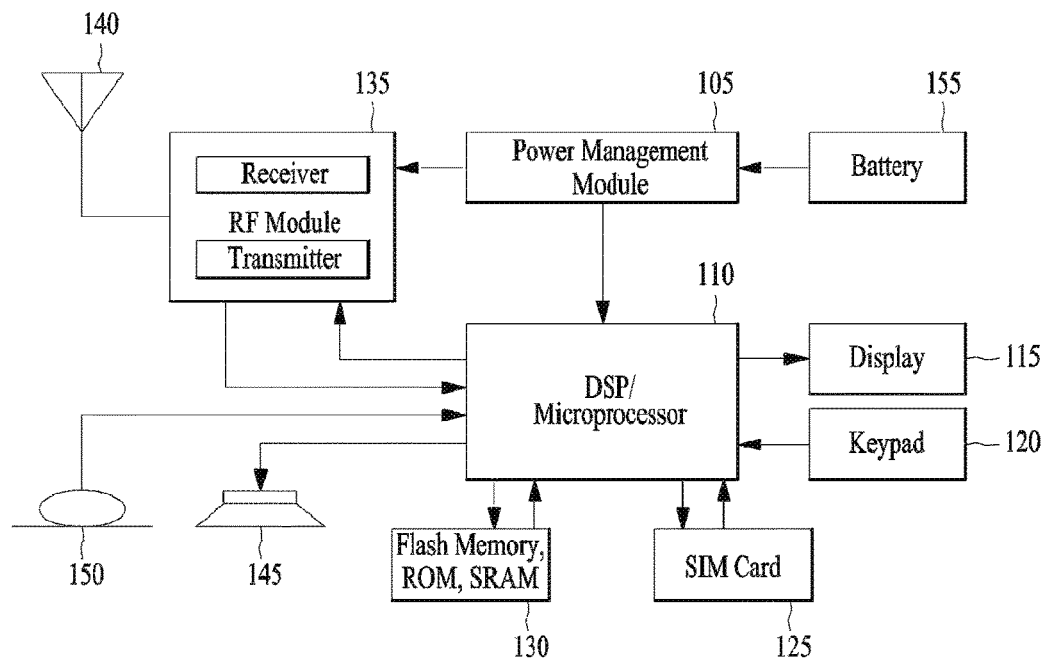
[Fig. 6]
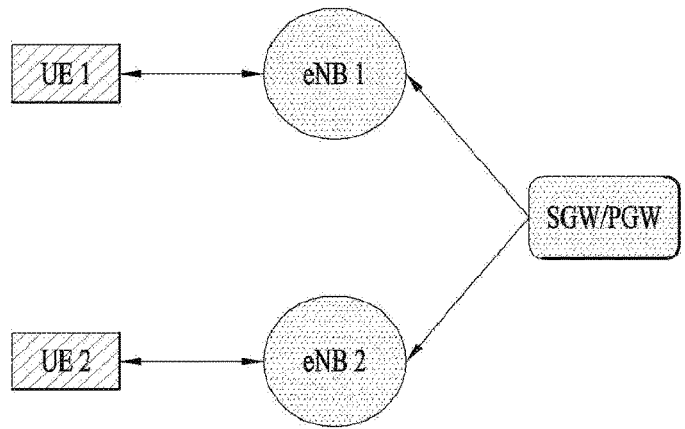
[Fig. 7]
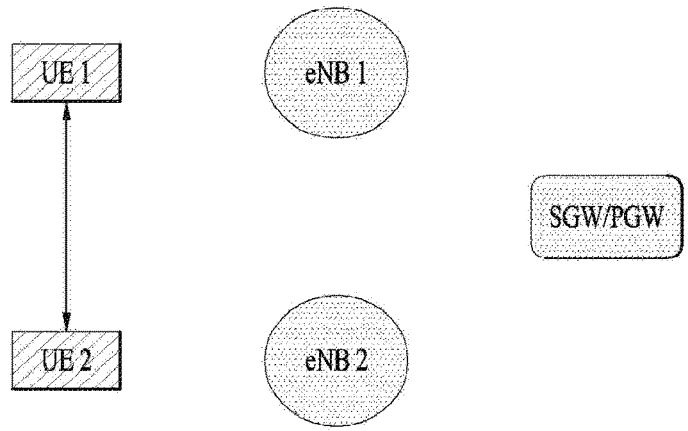

[Fig. 8]
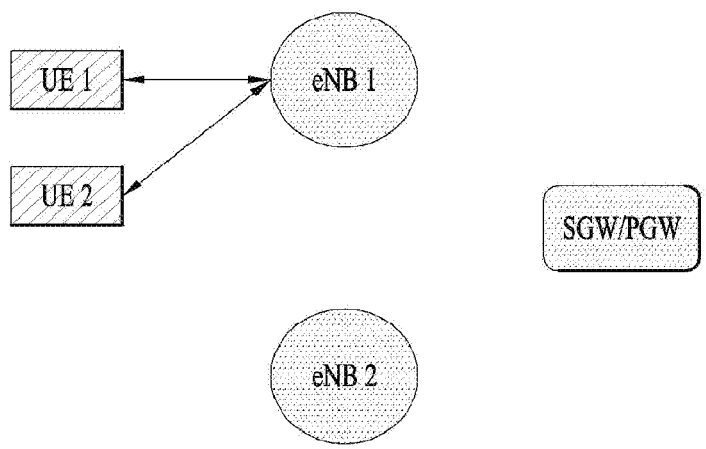
[Fig. 9]
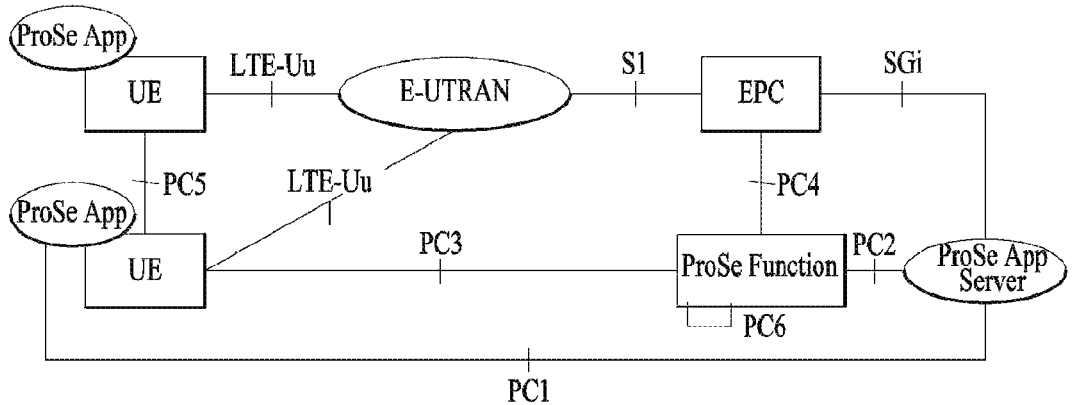

[Fig. 10]
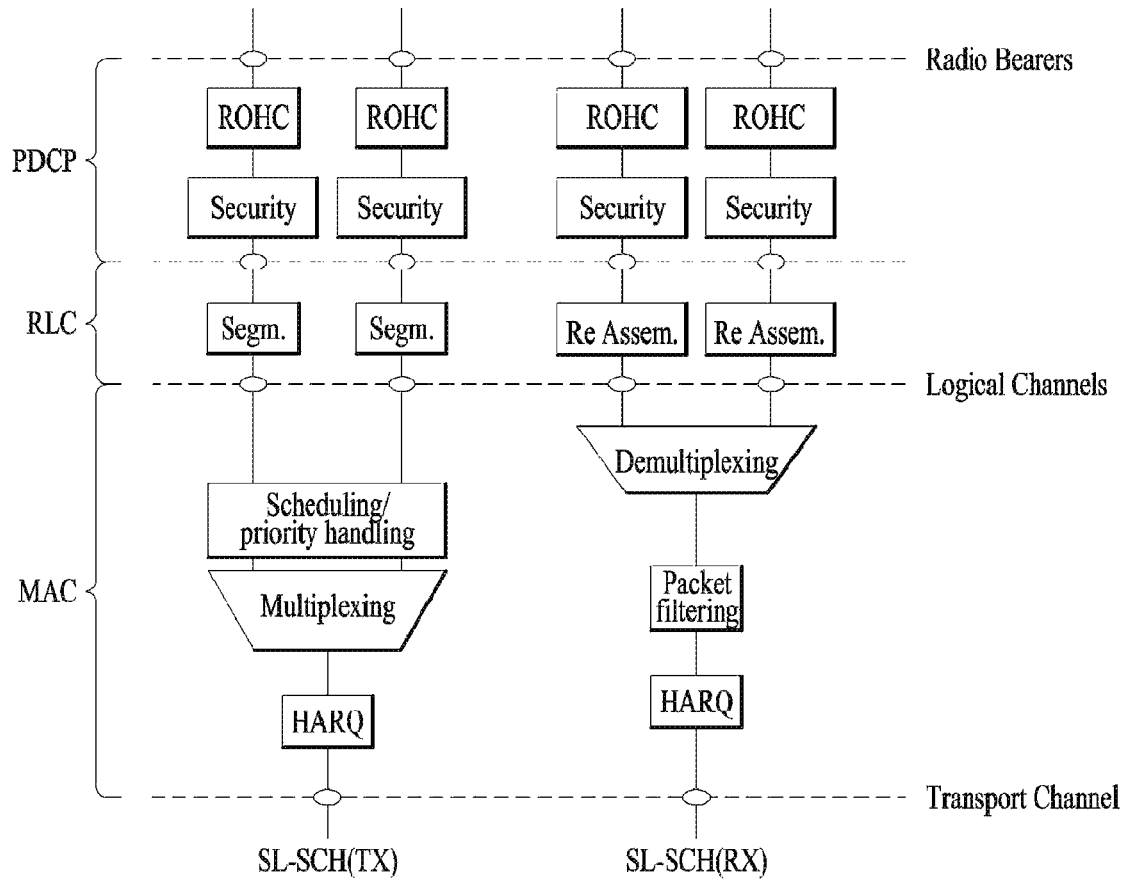
[Fig. 11a]
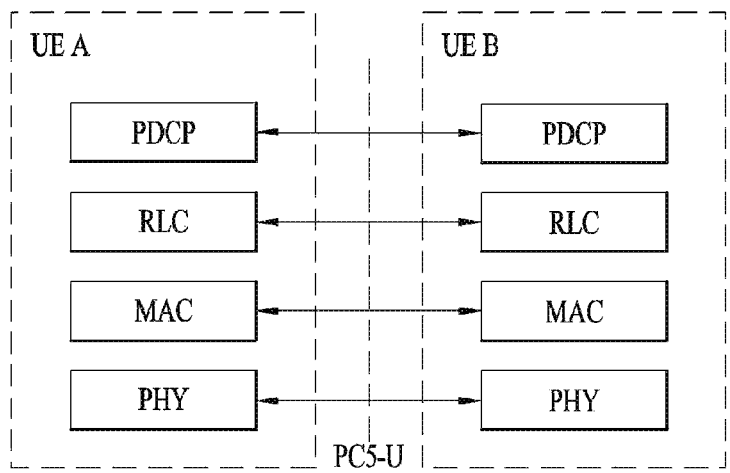

[Fig. 11b]
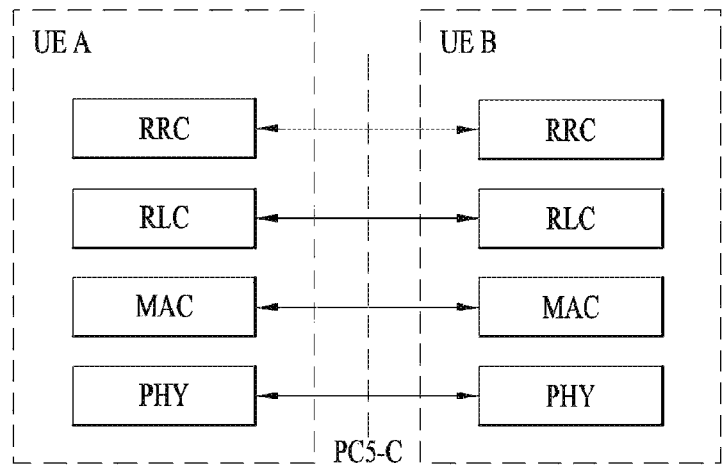
[Fig. 12]
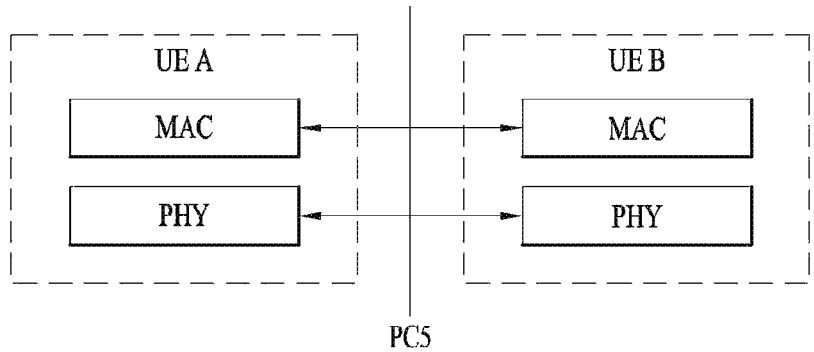
[Fig. 13]
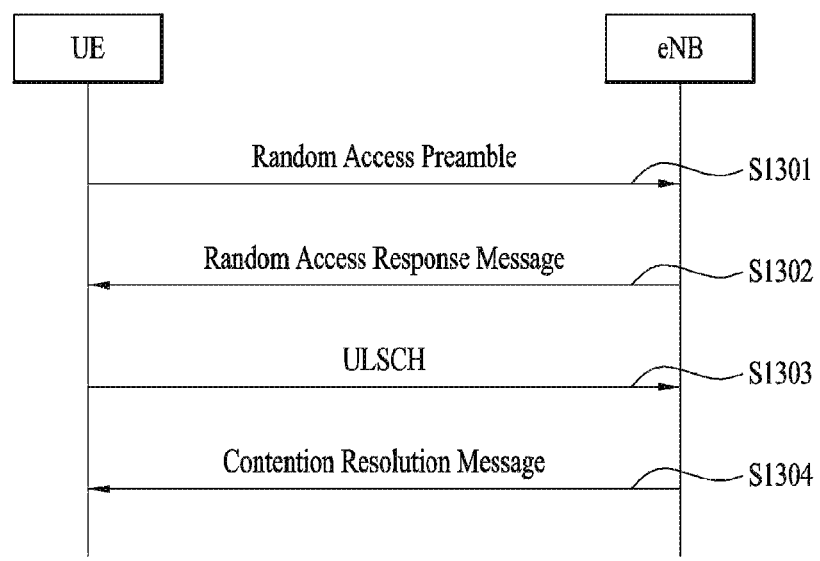

[Fig. 14]
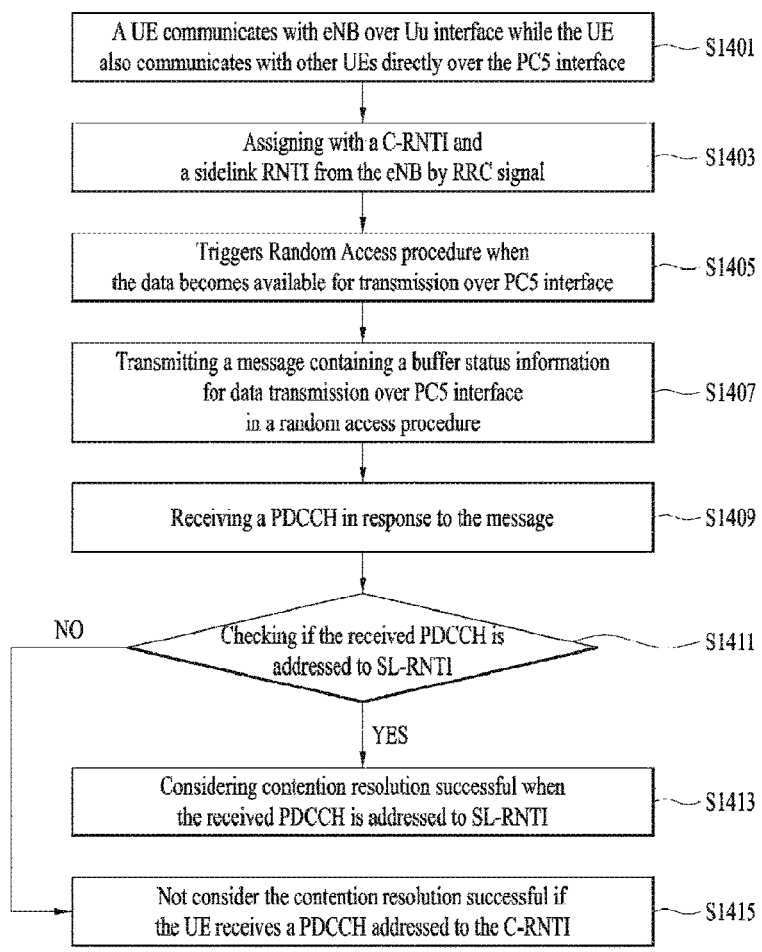

METHOD FOR CONTENTION RESOLUTION IN A RANDOM ACCESS PROCEDURE IN A D2D COMMUNICATION SYSTEM AND DEVICE THEREFOR

CROSS REFERENCE TO RELATED APPLICATIONS

This application is the National Phase of PCT/KR2015/007800 filed on Jul. 27, 2015, which claims priority under 35 U.S.C. § 119(e) to U.S. Provisional Application Nos. 62/060,523 and 62/076,487 respectively filed on Oct. 6, 2014 and Nov. 7, 2014, all of which are hereby expressly incorporated by reference into the present application.

TECHNICAL FIELD

The present invention relates to a wireless communication system and, more particularly, to a method for contention resolution in a random access procedure in a D2D (Device to Device) communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Device to device (D2D) communication refers to the distributed communication technology that directly transfers traffic between adjacent nodes without using infrastructure such as a base station. In a D2D communication environment, each node such as a portable terminal discovers user equipment physically adjacent thereto and transmits traffic after setting communication session. In this way, since D2D communication may solve traffic overload by distributing traffic concentrated into the base station, the D2D communication may have received attention as the element technology of the next generation mobile communication technology after 4G. For this reason, the standard institute such as 3GPP or IEEE has proceeded to establish the D2D communication standard on the basis of LTE-A or Wi-Fi, and Qualcomm has developed their own D2D communication technology.

It is expected that the D2D communication contributes to increase throughput of a mobile communication system and create new communication services. Also, the D2D communication may support proximity based social network services or network game services. The problem of link of a user equipment located at a shade zone may be solved by using a D2D link as a relay. In this way, it is expected that the D2D technology will provide new services in various fields.

The D2D communication technologies such as infrared communication, ZigBee, radio frequency identification (RFID) and near field communications (NFC) based on the RFID have been already used. However, since these technologies support communication only of a specific object within a limited distance (about 1 m), it is difficult for the technologies to be regarded as the D2D communication technologies strictly.

Although the D2D communication has been described as above, details of a method for transmitting data from a plurality of D2D user equipments with the same resource have not been suggested.

DISCLOSURE OF INVENTION

Technical Problem

An object of the present invention devised to solve the problem lies in a method and device for a method for contention resolution in a random access procedure in a D2D communication system. The technical problems solved by the present invention are not limited to the above technical problems and those skilled in the art may understand other technical problems from the following description.

Solution to Problem

The object of the present invention can be achieved by providing a method for operating by an apparatus in wireless communication system, the method comprising; transmitting a message containing a buffer status information for data transmission over PC5 interface in a random access procedure; receiving a Physical Downlink Control Channel (PDCCH) in response to the message; and considering contention resolution successful if the received PDCCH is addressed to sidelink-RNTI (SL-RNTI).

In another aspect of the present invention provided herein is an UE operating in wireless communication system, the UE comprising: a RF module; and processor configured to control the RF module, wherein the processor is configured to transmit a message containing a buffer status information for data transmission over PC5 interface in a random access procedure, to receive a Physical Downlink Control Channel (PDCCH) in response to the message, and to consider contention resolution successful if the received PDCCH is addressed to sidelink-RNTI (SL-RNTI).

Preferably, the method further comprises: triggering the random access procedure when the data becomes available for transmission over PC5 interface.

Preferably, the message further contains a Cell Radio Network Temporary Identifier (C-RNTI) MAC control element, or information of a buffer status for the data transmission over Uu interface.

Preferably, when the UE transmits the message containing a buffer status information for the data transmission over PC5 interface in random access procedure while not containing buffer status information for the data transmission over Uu interface, the UE does not consider the contention resolution successful if the UE receives a PDCCH addressed to the C-RNTI.

Preferably, the PDCCH addressed to the SL-RNTI doesn't include a sidelink grant used for data transmission over PC5 interface.

Preferably, if the PDCCH addressed to the SL-RNTI includes a sidelink grant used for the data transmission over PC5 interface, the sidelink grant does not include any scheduling information of the data transmission over PC5 interface.

Preferably, when the sidelink grant does not include any scheduling information of the data transmission over PC5 interface, the UE receives an indication from a base station, wherein the indication includes at least one of: a data length set to zero, a scheduling assignment set to a specific value, or an indication indicating that the grant used for the data transmission over PC5 interface does not provide any uplink resource for data transmission over PC5 interface.

It is to be understood that both the foregoing general description and the following detailed description of the present invention are exemplary and explanatory and are intended to provide further explanation of the invention as claimed.

Advantageous Effects of Invention

According to the present invention, contention resolution in a random access procedure can be performed using sidelink-RNTI in a D2D communication system under a certain condition.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2A is a block diagram illustrating network structure of an evolved universal mobile telecommunication system (E-UMTS), and FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4 is a diagram of an example physical channel structure used in an E-UMTS system;

FIG. 5 is a block diagram of a communication apparatus according to an embodiment of the present invention;

FIG. 6 is an example of default data path for a normal communication;

FIGS. 7 and 8 are examples of data path scenarios for a proximity communication;

FIG. 9 is a conceptual diagram illustrating for a non-roaming reference architecture;

FIG. 10 is a conceptual diagram illustrating for a Layer 2 Structure for Sidelink;

FIG. 11a is a conceptual diagram illustrating for User-Plane protocol stack for ProSe Direct Communication, and FIG. 11b is Control-Plane protocol stack for ProSe Direct Communication;

FIG. 12 is a conceptual diagram illustrating for a PC5 interface for ProSe Direct Discovery;

FIG. 13 is a diagram for an example method for performing a contention-based random access procedure; and FIG. 14 is a diagram for contention resolution in a random access procedure in a D2D communication system according to embodiments of the present invention.

BEST MODE FOR CARRYING OUT THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module transceiver (135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer?s choice.

Specifically, FIG. 5 may represent a UE comprising a receiver (135) configured to receive a request message from a network, and a transmitter (135) configured to transmit the transmission or reception timing information to the network. The receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. The transmitter and receiver may constitute the transceiver (135). The network further comprises a processor (110) connected to the transmitter and the receiver. This processor (110) may be configured to calculate latency based on the transmission or reception timing information.

FIG. 6 is an example of default data path for communication between two UEs. With reference to FIG. 6, even when two UEs (e.g., UE1, UE2) in close proximity communicate with each other, their data path (user plane) goes via the operator network. Thus a typical data path for the communication involves eNB(s) and/or Gateway(s) (GW(s)) (e.g., SGW/PGW).

FIGS. 7 and 8 are examples of data path scenarios for a proximity communication. If wireless devices (e.g., UE1, UE2) are in proximity of each other, they may be able to use a direct mode data path (FIG. 7) or a locally routed data path (FIG. 8). In the direct mode data path, wireless devices are connected directly each other (after appropriate procedure(s), such as authentication), without eNB and SGW/PGW. In the locally routed data path, wireless devices are connected each other through eNB only.

FIG. 9 is a conceptual diagram illustrating for a non-roaming reference architecture.

PC1 to PC5 represent interfaces. PC1 is a reference point between a ProSe application in a UE and a ProSe App server. It is used to define application level signaling requirements. PC2 is a reference point between the ProSe App Server and the ProSe Function. It is used to define the interaction between ProSe App Server and ProSe functionality provided by the 3GPP EPS via ProSe Function. One example may be for application data updates for a ProSe database in the ProSe Function. Another example may be data for use by ProSe App Server in interworking between 3GPP functionality and application data, e.g. name translation. PC3 is a reference point between the UE and ProSe Function. It is used to define the interaction between UE and ProSe Function. An example may be to use for configuration for ProSe discovery and communication. PC4 is a reference point between the EPC and ProSe Function. It is used to define the interaction between EPC and ProSe Function. Possible use cases may be when setting up a one-to-one communication path between UEs or when validating ProSe services (authorization) for session management or mobility management in real time.

PC5 is a reference point between UE to UE used for control and user plane for discovery and communication, for relay and one-to-one communication (between UEs directly and between UEs over LTE-Uu). Lastly, PC6 is a reference point may be used for functions such as ProSe Discovery between users subscribed to different PLMNs.

EPC (Evolved Packet Core) includes entities such as MME, S-GW, P-GW, PCRF, HSS etc. The EPC here represents the E-UTRAN Core Network architecture. Interfaces inside the EPC may also be impacted albeit they are not explicitly shown in FIG. 9.

Application servers, which are users of the ProSe capability for building the application functionality, e.g. in the Public Safety cases they can be specific agencies (PSAP) or in the commercial cases social media. These applications are defined outside the 3GPP architecture but there may be reference points towards 3GPP entities. The Application server can communicate towards an application in the UE.

Applications in the UE use the ProSe capability for building the application functionality. Example may be for communication between members of Public Safety groups or for social media application that requests to find buddies in proximity. The ProSe Function in the network (as part of EPS) defined by 3GPP has a reference point towards the ProSe App Server, towards the EPC and the UE.

The functionality may include but not restricted to e.g.:
Interworking via a reference point towards the 3rd party Applications
Authorization and configuration of the UE for discovery and Direct communication
Enable the functionality of the EPC level ProSe discovery
ProSe related new subscriber data and/handling of data storage; also handling of ProSe identities;
Security related functionality
Provide Control towards the EPC for policy related functionality
Provide functionality for charging (via or outside of EPC, e.g. offline charging)

Especially, the following identities are used for ProSe Direct Communication:

Source Layer-2 ID identifies a sender of a D2D packet at PC5 interface. The Source Layer-2 ID is used for identification of the receiver RLC UM entity;
Destination Layer-2 ID identifies a target of the D2D packet at PC5 interface. The Destination Layer-2 ID is used for filtering of packets at the MAC layer. The Destination Layer-2 ID may be a broadcast, groupcast or unicast identifier; and
SA L1 ID identifier in Scheduling Assignment (SA) at PC5 interface. SA L1 ID is used for filtering of packets at the physical layer. The SA L1 ID may be a broadcast, groupcast or unicast identifier.

No Access Stratum signaling is required for group formation and to configure Source Layer-2 ID and Destination Layer-2 ID in the UE. This information is provided by higher layers.

In case of groupcast and unicast, the MAC layer will convert the higher layer ProSe ID (i.e. ProSe Layer-2 Group ID and ProSe UE ID) identifying the target (Group, UE) into two bit strings of which one can be forwarded to the physical layer and used as SA L1 ID whereas the other is used as Destination Layer-2 ID. For broadcast, L2 indicates to L1 that it is a broadcast transmission using a pre-defined SA L1 ID in the same format as for group- and unicast.

FIG. 10 is a conceptual diagram illustrating for a Layer 2 structure for Sidelink.

The Sidelink is UE to UE interface for ProSe direct communication and ProSe Direct Discovery. Corresponds to the PC5 interface. The Sidelink comprises ProSe Direct Discovery and ProSe Direct Communication between UEs. The Sidelink uses uplink resources and physical channel structure similar to uplink transmissions. However, some changes, noted below, are made to the physical channels.

E-UTRA defines two MAC entities; one in the UE and one in the E-UTRAN. These MAC entities handle the following transport channels additionally, i) sidelink broadcast channel (SL-BCH), ii) sidelink discovery channel (SL-DCH) and iii) sidelink shared channel (SL-SCH).

Basic transmission scheme: the Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

Physical-layer processing: the Sidelink physical layer processing of transport channels differs from UL transmission in the following steps:

i) Scrambling: for PSDCH and PSCCH, the scrambling is not UE-specific;

ii) Modulation: 64 QAM is not supported for Sidelink

Physical Sidelink control channel: PSCCH is mapped to the Sidelink control resources. PSCCH indicates resource and other transmission parameters used by a UE for PSSCH.

Sidelink reference signals: for PSDCH, PSCCH and PSSCH demodulation, reference signals similar to uplink demodulation reference signals are transmitted in the 4th symbol of the slot in normal CP and in the 3rd symbol of the slot in extended cyclic prefix. The Sidelink demodulation reference signals sequence length equals the size (number of sub-carriers) of the assigned resource. For PSDCH and PSCCH, reference signals are created based on a fixed base sequence, cyclic shift and orthogonal cover code.

Physical channel procedure: for in-coverage operation, the power spectral density of the sidelink transmissions can be influenced by the eNB.

FIG. 11a is a conceptual diagram illustrating for User-Plane protocol stack for ProSe Direct Communication, and FIG. 11b is Control-Plane protocol stack for ProSe Direct Communication.

FIG. 11a shows the protocol stack for the user plane, where PDCP, RLC and MAC sublayers (terminate at the other UE) perform the functions listed for the user plane (e.g. header compression, HARQ retransmissions). The PC5 interface consists of PDCP, RLC, MAC and PHY as shown in FIG. 11a.

User plane details of ProSe Direct Communication: i) MAC sub header contains LCIDs (to differentiate multiple logical channels), ii) The MAC header comprises a Source Layer-2 ID and a Destination Layer-2 ID, iii) At MAC Multiplexing/demultiplexing, priority handling and padding are useful for ProSe Direct communication, iv) RLC UM is used for ProSe Direct communication, v) Segmentation and reassembly of RLC SDUs are performed, vi) A receiving UE needs to maintain at least one RLC UM entity per transmitting peer UE, vii) An RLC UM receiver entity does not need to be configured prior to reception of the first RLC UM data unit, and viii) U-Mode is used for header compression in PDCP for ProSe Direct Communication.

FIG. 11b shows the protocol stack for the control plane, where RRC, RLC, MAC, and PHY sublayers (terminate at the other UE) perform the functions listed for the control plane. A D2D UE does not establish and maintain a logical connection to receiving D2D UEs prior to a D2D communication.

FIG. 12 is a conceptual diagram illustrating for a PC5 interface for ProSe Direct Discovery.

ProSe Direct Discovery is defined as the procedure used by the ProSe-enabled UE to discover other ProSe-enabled UE(s) in its proximity using E-UTRA direct radio signals via PC5.

Radio Protocol Stack (AS) for ProSe Direct Discovery is shown in FIG. 12.

The AS layer performs the following functions:

Interfaces with upper layer (ProSe Protocol): The MAC layer receives the discovery information from the upper layer (ProSe Protocol). The IP layer is not used for transmitting the discovery information.

Scheduling: The MAC layer determines the radio resource to be used for announcing the discovery information received from upper layer.

Discovery PDU generation: The MAC layer builds the MAC PDU carrying the discovery information and sends the MAC PDU to the physical layer for transmission in the determined radio resource. No MAC header is added.

There are two types of resource allocation for discovery information announcement.

Type 1: A resource allocation procedure where resources for announcing of discovery information are allocated on a non UE specific basis, further characterized by: i) The eNB provides the UE(s) with the resource pool configuration used for announcing of discovery information. The configuration may be signalled in SIB, ii) The UE autonomously selects radio resource(s) from the indicated resource pool and announce discovery information, iii) The UE can announce discovery information on a randomly selected discovery resource during each discovery period.

Type 2: A resource allocation procedure where resources for announcing of discovery information are allocated on a per UE specific basis, further characterized by: i) The UE in RRC_CONNECTED may request resource (s) for announcing of discovery information from the eNB via RRC, ii) The eNB assigns resource(s) via RRC, iii) The resources are allocated within the resource pool that is configured in UEs for monitoring.

For UEs in RRC_IDLE, the eNB may select one of the following options:

The eNB may provide a Type 1 resource pool for discovery information announcement in SIB. UEs that are authorized for Prose Direct Discovery use these resources for announcing discovery information in RRC_IDLE.

The eNB may indicate in SIB that it supports D2D but does not provide resources for discovery information announcement. UEs need to enter RRC Connected in order to request D2D resources for discovery information announcement.

For UEs in RRC_CONNECTED,

A UE authorized to perform ProSe Direct Discovery announcement indicates to the eNB that it wants to perform D2D discovery announcement.

The eNB validates whether the UE is authorized for ProSe Direct Discovery announcement using the UE context received from MME.

The eNB may configure the UE to use a Type 1 resource pool or dedicated Type 2 resources for discovery information announcement via dedicated RRC signaling (or no resource).

The resources allocated by the eNB are valid until a) the eNB de-configures the resource(s) by RRC signaling or b) the UE enters IDLE. (FFS whether resources may remain valid even in IDLE).

Receiving UEs in RRC_IDLE and RRC_CONNECTED monitor both Type 1 and Type 2 discovery resource pools as authorized. The eNB provides the resource pool configuration used for discovery information monitoring in SIB. The SIB may contain discovery resources used for announcing in neighbor cells as well.

In summary, for the PC5 interface, there are several features as following:

i) The Source Layer-2 ID and the Destination Layer-2 ID in front of the MAC PDU without MAC subheader, ii) It is too early to exclude MAC CE for D2D, iii) One D2D group can be composed of UEs supporting different MAC PDU formats, iv) Include a MAC PDU format version number in the first field of D2D MAC PDU, v) Separate HARQ entity for D2D.

On the other hand, for the Uu interface, there are several features different from the PC5 interface as following:

i) The UE can belong to multiple groups, ii) It might be beneficial for the network to know which buffer status information is mapped to which D2D communication groups of a UE, iii) Group Index is informed to the eNB by BSR (either explicit or implicit), iv) The eNB is aware of Group ID, and mapping relation between Group ID and Group Index, and v) The UE reports Group ID, and mapping relation between Group ID and Group Index to the eNB.

FIG. 13 is a view illustrating an operating procedure of a UE and an eNB in a contention based random access procedure.

The random access procedure takes two distinct forms. One is a contention based (applicable to first five events) random access procedure and the other one is a non-contention based (applicable to only handover, DL data arrival and positioning) random access procedure. The non-contention based random access procedure is also called as dedicated RACH process.

First, the UE may randomly select a single random access preamble from a set of random access preambles indicated through system information or a handover command, and select and transmit a Physical Random Access Channel (PRACH) capable of transmitting the random access preamble (S1301).

A method of receiving random access response information is similar to the above-described non-contention based random access procedure. That is, the UE attempts to receive its own random access response within a random access response reception window indicated by the eNode B through the system information or the handover command, after the random access preamble is transmitted in step S1201, and receives a Physical Downlink Shared Channel (PDSCH) using random access identifier information corresponding thereto (S1302). Accordingly, the UE may receive a UL Grant, a Temporary C-RNTI, a TAC and the like.

If the UE has received the random access response valid for the UE, the UE may process all of the information included in the random access response. That is, the UE applies the TAC, and stores the temporary C-RNTI. In addition, data which will be transmitted in correspondence with the reception of the valid random access response may be stored in a Msg3 buffer.

The UE uses the received UL Grant so as to transmit the data (that is, the message 3) to the eNode B (S1303). The message 3 should include a UE identifier. In the contention based random access procedure, the eNode B may not determine which UEs are performing the random access procedure, but later the UEs should be identified for contention resolution.

Here, two different schemes for including the UE identifier may be provided. A first scheme is to transmit the UE's cell identifier through an uplink transmission signal corresponding to the UL Grant if the UE has already received a valid cell identifier allocated by a corresponding cell prior to the random access procedure. Conversely, the second scheme is to transmit the UE's unique identifier (e.g., S-TMSI or random ID) if the UE has not received a valid cell identifier prior to the random access procedure. In general, the unique identifier is longer than the cell identifier. If the UE has transmitted data corresponding to the UL Grant, the UE starts a contention resolution (CR) timer.

After transmitting the data with its identifier through the UL Grant included in the random access response, the UE waits for an indication (instruction) from the eNode B for contention resolution. That is, the UE attempts to receive the PDCCH so as to receive a specific message (S1304). Here, there are two schemes to receive the PDCCH. As described above, the UE attempts to receive the PDCCH using its own cell identifier if the message 3 transmitted in correspondence with the UL Grant is transmitted using the UE's cell identifier, and the UE attempts to receive the PDCCH using the temporary C-RNTI included in the random access response if the identifier is its unique identifier. Thereafter, in the former scheme, if the PDCCH is received through its own cell identifier before the contention resolution timer is expired, the UE determines that the random access procedure has been normally performed and completes the random access procedure. In the latter scheme, if the PDCCH is received through the temporary C-RNTI before the contention resolution timer has expired, the UE checks data transferred by the PDSCH indicated by the PDCCH. If the unique identifier of the UE is included in the data, the UE determines that the random access procedure has been normally performed and completes the random access procedure.

Contention Resolution is based on either C-RNTI on PDCCH of the PCell or UE Contention Resolution Identity on DL-SCH. Once Msg3 is transmitted, the UE may start or re-start mac-ContentionResolutionTimer at each HARQ retransmission, and monitor the PDCCH until mac-ContentionResolutionTimer expires or is stopped regardless of the possible occurrence of a measurement gap. And if notification of a reception of a PDCCH transmission is received from lower layers, if the C-RNTI MAC control element was included in Msg3, and if the Random Access procedure was initiated by the MAC sublayer itself and the PDCCH transmission is addressed to the C-RNTI and contains an UL grant for a new transmission, or if the Random Access procedure was initiated by a PDCCH order and the PDCCH transmission is addressed to the C-RNTI, the UE may consider this Contention Resolution successful, stop mac-ContentionResolutionTimer, discard the Temporary C-RNTI, and consider this Random Access procedure successfully completed.

In ProSe communication, sidelink-RNTI (D2D-RNTI) was introduced to distinguish sidelink grant for ProSe communication from uplink grant for WAN communication. This means that if the UE receives the PDCCH addressed to a sidelink-RNTI, the PDCCH would contain sidelink grant for ProSe transmission. Else if the UE receives the PDCCH addressed to the C-RNTI, the PDCCH would contain UL grant for WAN communication.

In the legacy system, the contention resolution in RA procedure was based on C-RNTI. In other words, the contention resolution succeeds when the UE receives PDCCH addressed to the C-RNTI and the PDCCH transmission contains an UL grant for a new transmission. By introduction of sidelink-RNTI, the eNB is able to use sidelink-RNTI for contention resolution as well because sidelink-RNTI is a UE specific RNTI.

Thus, if the UE transmits only Uu BSR in Msg3, the contention is not resolved when PDCCH transmission is addressed to the SL-RNTI. Currently, the contention is resolved when the UE receives PDCCH transmission addressed to the C-RNTI and contains an UL grant for a new transmission. The question would be whether the contention is also resolved by PDCCH reception addressed to the SL-RNTI or not.

When the eNB receives a Msg3 including only Uu BSR, the eNB cannot know whether a ProSe BSR is triggered or not. In this case, as the eNB receives a Msg3 including a Uu BSR, it is logical that the eNB transmits PDCCH addressed to the C-RNTI including uplink grant. However, given that SL-RNTI is used for providing SL grant, we see no motivation in providing SL grant to the UE even in case the eNB does not receive a ProSe BSR. Moreover, if the eNB provides a SL grant, the UE may perform PC5 data transmission by padding, which is waste of resource and takes away the reception opportunity for a half-duplex ProSe UE.

Therefore, if the UE transmits only Uu BSR in the Msg3, we propose that contention is not resolved if PDCCH transmission is addressed to the SL-RNTI.

And also, the eNB provides the grant only when the eNB schedules the UE, hence there is no grant that includes no scheduling information (empty scheduling information). This implies that if the eNB doesn't want to schedule the UE, the eNB will not provide grant to the UE. As a result, there would be a case that the contention resolution of a ProSe UE succeeds in the eNB side but the eNB doesn't transmit PDCCH addressed to sidelink-RNTI because the eNB doesn't want to provide ProSe grant for the UE. In this case, the contention resolution fails in the UE side because the UE may not receive PDCCH addressed to sidelink-RNTI within the mac-ContentionResolutionTimer. Then, the UE will perform the RA procedure from RA preamble selection step, which is inefficient and waste of radio resource.

The concerned scenarios would be: i) the UE transmits sidelink BSR in Msg3, ii) the UE transmits both of sidelink BSR and legacy BSR in Msg3.

For those scenarios, a mechanism is needed that contention resolution is based on sidelink-RNTI for ProSe UE.

FIG. 14 is a diagram for contention resolution in a random access procedure in a D2D communication system according to embodiments of the present invention.

As the UE transmits a sidelink BSR in Msg3, it seems straightforward that the UE considers the contention is resolved when the UE receives a PDCCH transmission addressed to SL-RNTI. The question would be whether the contention is also resolved by PDCCH reception addressed to the C-RNTI containing UL grant for a new transmission or not.

When the eNB receives a Msg3 including only sidelink BSR, the eNB knows that no Uu BSR has been triggered. In this case, as the eNB receives sidelink BSR, it makes sense that the eNB transmits PDCCH addressed to the SL-RNTI. However, it is strange that the eNB provides an UL grant to the UE even though the eNB is aware that UE has not triggered any Uu BSR. Moreover, if the eNB provides an UL grant, the UE performs Uu data transmission by padding, which is a waste of uplink resources.

Therefore, if the UE transmits only sidelink BSR in the Msg3, we propose that contention is not resolved if PDCCH transmission is addressed to the C-RNTI and contains uplink grant for a new transmission, but resolved if PDCCH transmission is addressed to the SL-RNTI.

In this invention, when the UE transmits Msg3 containing a buffer status information for the data transmission over PC5 interface, i.e., sidelink BSR (or ProSe BSR), the UE considers the contention resolution successful if the UE receives a PDCCH addressed to sidelink-RNTI (or D2D-RNTI).

A UE communicates with eNB over Uu interface while the UE also communicates with other UEs directly over the PC5 interface (S1401).

A UE transmits/receives the data to/from the eNB over Uu interface. And the the UE transmits/receives the data directly to/from other UEs over PC5 interface.

The UE is assigned with a C-RNTI and a sidelink RNTI from the eNB by RRC signal (S1403), and when the data becomes available for transmission over PC5 interface, the UE triggers Random Access procedure (S1405).

During Random Access procedure, the UE transmits Msg3 to the eNB (S1407).

Preferably, the Msg3 can be contained i) C-RNTI MAC control element, ii) information of a buffer status for the data transmission over PC5 interface, i.e., sidelink BSR, iii) information of a buffer status for the data transmission over Uu interface, i.e., WAN BSR.

After step of S1407, the UE receives a PDDCH in response to the Msg3 (S1409).

Preferably, the received PDCCH is addressed to sidelink-RNTI (SL-RNTI).

Preferably, the PDCCH addressed to the SL-RNTI includes or doesn't include a sidelink grant used for data transmission over PC5 interface.

Preferably, although the PDCCH addressed to the SL-RNTI includes a sidelink grant used for the data transmission over PC5 interface, the sidelink grant does not include any scheduling information of the data transmission over PC5 interface.

If the sidelink grant does not include any scheduling information of the data transmission over PC5 interface, the eNB indicates that the sidelink grant does not include any scheduling information of data transmission over PC5 interface by: i) setting the data length to zero, or ii) setting the Scheduling Assignment to a specific value, or iii) indicating that the sidelink grant does not provide any uplink resource for data transmission over PC5 interface.

When the UE transmits Msg3 containing C-RNTI MAC control element, or when the UE transmits Msg3 containing ProSe BSR and C-RNTI MAC control element, or when the UE transmits Msg3 containing ProSe BSR, WAN BSR and C-RNTI MAC control element, the UE considers contention resolution successful if the received PDCCH is addressed to SL-RNTI (S1413).

On the other hand, when the UE transmits the message containing a buffer status information for the data transmission over PC5 interface in random access procedure while not containing buffer status information for the data transmission over Uu interface, the UE does not consider the contention resolution successful if the UE receives a PDCCH addressed to the C-RNTI (S1415).

Thus, if the UE transmits only ProSe BSR in Msg3, the contention is resolved when PDCCH transmission is addressed to the SL-RNTI and if the UE transmits only ProSe BSR in Msg3, the contention is not resolved when PDCCH transmission is addressed to the C-RNTI and contains uplink grant for a new transmission.

And if the UE transmits both of ProSe BSR and Uu BSR in Msg3, the contention is resolved when PDCCH transmission is addressed to the C-RNTI and contains an UL grant for a new transmission, or when PDCCH transmission is addressed to the SL-RNTI.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a User Equipment (UE) operating in a wireless communication system, the method comprising:

transmitting a message including buffer status information for a data transmission over a PC5 interface in a random access procedure;

receiving a Physical Downlink Control Channel (PDCCH) in response to the message; and wherein, if the received PDCCH is addressed to a sidelink-radio network temporary identity (SL-RNTI), regardless of the message including buffer status information for a data transmission over a Uu interface, the UE determines that contention resolution of the random access procedure is successful, wherein if the message does not include the buffer status information for the data transmission over the Uu interface and the received PDCCH is addressed to a cell radio network temporary identity (C-RNTI) and the PDCCH includes an uplink grant for a new transmission, the UE determines that the contention resolution of the random access procedure is not successful, wherein, if the message further includes the buffer status information for the data transmission over the Uu interface and the received PDCCH is addressed to the C-RNTI and the PDCCH includes the uplink grant for the new transmission, the UE determines that the contention resolution of the random access procedure is successful, and wherein the PDCCH addressed to the SL-RNTI includes a sidelink grant used for the data transmission over the PC5 interface, and a value of a Scheduling Assignment identifier (SA ID) used for filtering packets at a physical layer is set to a specific value for indicating the sidelink grant does not include any scheduling information of the data transmission over the PC5 interface.

2. The method according to claim 1, further comprising: triggering the random access procedure when the data becomes available for transmission over the PC5 interface, with the UE maintaining uplink synchronization for a network.

3. A User Equipment (UE) operating in a wireless communication system, the UE comprising:

a transceiver; and a processor configured to control the transceiver, wherein the processor is configured to:

transmit a message including buffer status information for data transmission over a PC5 interface in a random access procedure, receive a Physical Downlink Control Channel (PDCCH) in response to the message, and wherein, if the received PDCCH is addressed to a sidelink-radio network temporary identity (SL-RNTI), regardless of the message including buffer status information for a data transmission over a Uu interface, the UE determines that contention resolution of the random access procedure is successful, wherein if the message does not include the buffer status information for the data transmission over the Uu interface and the received PDCCH is addressed to a cell radio network temporary identity (C-RNTI) and the PDCCH includes an uplink grant for a new transmission, the UE determines that the contention resolution of the random access procedure is not successful, wherein, if the message further includes the buffer status information for the data transmission over the Uu interface and the received PDCCH is addressed to the C-RNTI and the PDCCH includes the uplink grant for the new transmission, the UE determines that the contention resolution of the random access procedure is successful, and wherein the PDCCH addressed to the SL-RNTI includes a sidelink grant used for the data transmission over the PC5 interface, and a value of a Scheduling Assignment identifier (SA ID) used for filtering packets at a physical layer is set to a specific value for indicating the sidelink grant does not include any scheduling information of the data transmission over the PC5 interface.

4. The UE according to claim 3, wherein the processor is further configured to trigger the random access procedure when the data becomes available for transmission over the PC5 interface, with the UE maintaining uplink synchronization for a network.

* * * * *